J. P. CLOPTON.
Harness-Hames.
No. 167,305.  Patented Aug. 31, 1875.
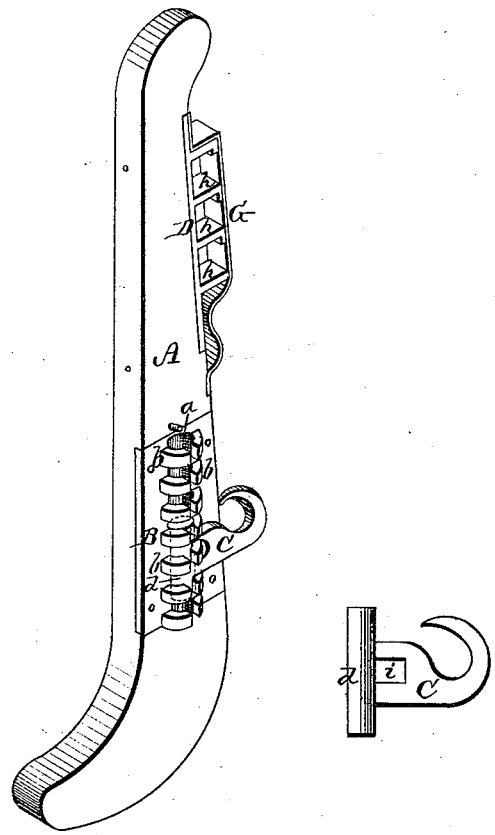
WITNESSES
F. L. Ourand.
C. L. Evert.
INVENTOR
J. P. Clopton
per
Alexander Mason
ATTORNEYS
N. PETERS, PHOTO-LITHOGRAPHER, WASHINGTON, D C.

UNITED STATES PATENT OFFICE.

JAMES P. CLOPTON, OF MILAN, TENNESSEE.

IMPROVEMENT IN HARNESS-HAMES.

Specification forming part of Letters Patent No. 167,305, dated August 31, 1875; application filed March 6, 1875.

*To all whom it may concern:*

Be it known that I, J. P. CLOPTON, of Milan, in the county of Gibson and in the State of Tennessee, have invented certain new and useful Improvements in Hames; and do hereby declare that the following is a full, clear, and exact description thereof, reference being had to the accompanying drawings, and to the letters of reference marked thereon, making a part of this specification.

The nature of my invention consists in the construction and arrangement of a hame fixture, as will be hereinafter more fully set forth.

In order to enable others skilled in the art to which my invention appertains to make and use the same, I will now proceed to describe its construction and operation, referring to the annexed drawing, which fully represents my invention.

A represents an ordinary hame, provided a suitable distance above its lower end with a plate, B, let into the hame, as shown. On this plate are formed two series of curved hooks, $b\ b$, placed directly opposite each other with suitable spaces between them, and the plate between the two series of hooks is hollowed out, as shown at $a$, the whole forming, as it were, a tube, having one vertical slot its entire length on the front, and a series of cross-slots extending from the longitudinal slot toward each side. In the tube thus formed is placed a rod, $d$, formed on the inner end of a hook, C, to which the trace-tug is attached. The body of the hook C is formed with a slot, $i$, of suitable size for one of the hooks $b$ to pass through the same, while the metal on both sides of the slot fits in between the hooks $b\ b$. The hook C can easily be adjusted up and down, so as to elevate or depress the front end of the trace, as desired. I prefer to use with this a device constructed as follows:

On the outer edge of the hame at this end is fastened a plate, D, provided with L-shaped projections $h\ h$, the outer ends of which extend downward, as shown. G is a spring fastened to the edge of the hame above and below the plate D, and resting against the ends of the projections $h$. This spring is constructed in such a manner as to allow of its contraction in slipping over the stops or projections $h$.

The device above described being independent of the hook C and the fastening-plate B I make no claim to such in this application.

Having thus fully described my invention, what I claim as new, and desire to secure by Letters Patent, is—

The combination of the plate B, provided with the curved hooks $b\ b$ and hollowed out at $a$, and the hook C, provided with the rod $d$, and slot $i$, substantially as and for the purposes herein set forth.

In testimony that I claim the foregoing I have hereunto set my hand this 2d day of February, 1875.

J. P. CLOPTON.

Witnesses:
 W. J. HOUSE,
 P. B. MARTIN.